(12) United States Patent
Shi et al.

(10) Patent No.: US 10,318,305 B2
(45) Date of Patent: Jun. 11, 2019

(54) SYSTEM AND METHOD FOR AN ASYNCHRONOUS PROCESSOR WITH PEPELINED ARITHMETIC AND LOGIC UNIT

(71) Applicant: Huawei Technologies Co., Ltd., Shenzhen (CN)

(72) Inventors: Wuxian Shi, Kanata (CA); Yiqun Ge, Kanata (CA); Qifan Zhang, Lachine (CA); Tao Huang, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 14/477,536

(22) Filed: Sep. 4, 2014

(65) Prior Publication Data

US 2015/0074377 A1 Mar. 12, 2015

Related U.S. Application Data

(60) Provisional application No. 61/874,909, filed on Sep. 6, 2013.

(51) Int. Cl.
*G06F 9/38* (2018.01)
*G06F 9/30* (2018.01)
*G06F 9/448* (2018.01)

(52) U.S. Cl.
CPC .......... *G06F 9/3871* (2013.01); *G06F 9/3802* (2013.01); *G06F 9/3836* (2013.01); *G06F 9/3885* (2013.01); *G06F 9/4494* (2018.02)

(58) Field of Classification Search
CPC ..... G06F 9/3871; G06F 9/3802; G06F 9/3836
(Continued)

(56) References Cited

U.S. PATENT DOCUMENTS 5,434,520 A * 7/1995 Yetter .................. G06F 7/5016
326/93
5,553,276 A * 9/1996 Dean ..................... G06F 9/3871
712/E9.063
(Continued)

FOREIGN PATENT DOCUMENTS

| CN | 1319209 A | 10/2001 |
| CN | 1432152 A | 7/2003 |

(Continued)

OTHER PUBLICATIONS

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.*

(Continued)

*Primary Examiner* — Yuqing Xiao
(74) *Attorney, Agent, or Firm* — Slater Matsil, LLP

(57) ABSTRACT

Embodiments are provided for an asynchronous processor with pipelined arithmetic and logic unit. The asynchronous processor includes a non-transitory memory for storing instructions and a plurality of instruction execution units (XUs) arranged in a ring architecture for passing tokens. Each one of the XUs comprises a logic circuit configured to fetch a first instruction from the non-transitory memory, and execute the first instruction. The logic circuit is also configured to fetch a second instruction from the non-transitory memory, and execute the second instruction, regardless whether the one of the XUs holds a token for writing the first instruction. The logic circuit is further configured to write the first instruction to the non-transitory memory after fetching the second instruction.

18 Claims, 8 Drawing Sheets

(58) Field of Classification Search
USPC .......................................................... 712/25
See application file for complete search history.

(56) References Cited

U.S. PATENT DOCUMENTS

| | | | | |
|---|---|---|---|---|
| 5,920,899 | A * | 7/1999 | Chu | G06F 5/08 711/169 |
| 6,867,620 | B2 * | 3/2005 | Singh | G06F 9/3871 326/112 |
| 7,484,078 | B2 * | 1/2009 | Bink | G06F 9/3824 712/218 |
| 7,971,038 | B2 * | 6/2011 | Wielage | G06F 7/00 326/93 |
| 8,448,105 | B2 * | 5/2013 | Dimou | G06F 9/3869 716/103 |
| 2002/0156995 | A1 * | 10/2002 | Martin | G06F 9/3824 712/201 |
| 2004/0044878 | A1 | 3/2004 | Evans et al. | |
| 2004/0073781 | A1 | 4/2004 | Hokenek et al. | |
| 2005/0156633 | A1 | 7/2005 | Singh et al. | |
| 2006/0292292 | A1 | 12/2006 | Brightman et al. | |
| 2008/0294879 | A1 | 11/2008 | Wielage | |
| 2011/0078418 | A1 | 3/2011 | Rozas et al. | |

FOREIGN PATENT DOCUMENTS

| | | |
|---|---|---|
| CN | 1678988 A | 10/2005 |
| CN | 101132336 A | 2/2008 |
| CN | 101258463 A | 9/2008 |

OTHER PUBLICATIONS

Michel Laurence, "Introduction to Octasic Asynchronous Processor Technology," May 2012, IEEE 18th International Symposium on Asynchronous Circuits and Systems, pp. 113-117.*

Shen et al., "Modern Processor Design," Oct. 2002, Beta ed., pp. 12-30.*

International Search Report and Written Opinion received in International Application No. PCT/CN2014/086091 dated Dec. 17, 2014, 14 pages.

Norwick, Steven M., et al., "High-Performance Asynchronous Pipelines: An overview." IEEE Design & Test of Computers 28.5, Sep. 2011, pp. 8-22.

Shen, Jean Paul et al, "Processor Design", Modern Processor Design: Fundamentals of Superscalar Processors, Waveland Press, 2013. 11 pages.

* cited by examiner

SYSTEM AND METHOD FOR AN ASYNCHRONOUS PROCESSOR WITH PEPELINED ARITHMETIC AND LOGIC UNIT

This application claims the benefit of U.S. Provisional Application No. 61/874,909 filed on Sep. 6, 2013 by Wuxian Shi et al. and entitled "Method and Apparatus of an Asynchronous Processor with Pipelined Arithmetic and Logic Unit," which is hereby incorporated herein by reference as if reproduced in its entirety.

TECHNICAL FIELD

The present invention relates to asynchronous processing, and, in particular embodiments, to system and method for an asynchronous processor with pipelined arithmetic and logic unit.

BACKGROUND

Micropipeline is a basic component for asynchronous processor design. Important building blocks of the micropipeline include the RENDEZVOUS circuit such as, for example, a chain of Muller-C elements. A Muller-C element can allow data to be passed when the current computing logic stage is finished and the next computing logic stage is ready to start. Instead of using non-standard Muller-C elements to realize the handshaking protocol between two clockless (without using clock timing) computing circuit logics, the asynchronous processors replicate the whole processing block (including all computing logic stages) and use a series of tokens and token rings to simulate the pipeline. Each processing block contains a token processing logic to control the usage of tokens without time or clock synchronization between the computing logic stages. Thus, the processor design is referred to as an asynchronous or clockless processor design. The token ring regulates the access to system resources. The token processing logic accepts, holds, and passes tokens between each other in a sequential manner. When a token is held by a token processing logic, the block can be granted the exclusive access to a resource corresponding to that token, until the token is passed to a next token processing logic in the ring. There is a need for an improved and more efficient asynchronous processor architecture such as a processor capable for computations with less latency or delay.

SUMMARY OF THE INVENTION

In accordance with an embodiment, a method performed by an asynchronous processor includes fetching, at an instruction execution unit (XU) of the asynchronous processor, a first instruction, and executing the first instruction in the XU. Upon holding, at the XU, a token for fetching a next instruction, a second instruction is fetched. Upon holding, at the XU, a token for launching the next instruction, the second instruction is executed.

In accordance with another embodiment, a method performed by an arithmetic and logic unit (ALU) of an asynchronous processor includes fetching a first instruction, and executing the first instruction. A second instruction is fetched before writing the first instruction to a memory. The second instruction is executed at the ALU.

In accordance with yet another embodiment, an apparatus for an asynchronous processor comprises a non-transitory memory for storing instructions and a plurality of instruction execution units (XUs) arranged in a ring architecture for passing tokens. Each one of the XUs comprises a logic circuit configured to fetch a first instruction from the non-transitory memory, and execute the first instruction, fetch a second instruction from the non-transitory memory. The logic circuit is configured to execute the second instruction, regardless whether the one of the XUs holds a token for writing the first instruction.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
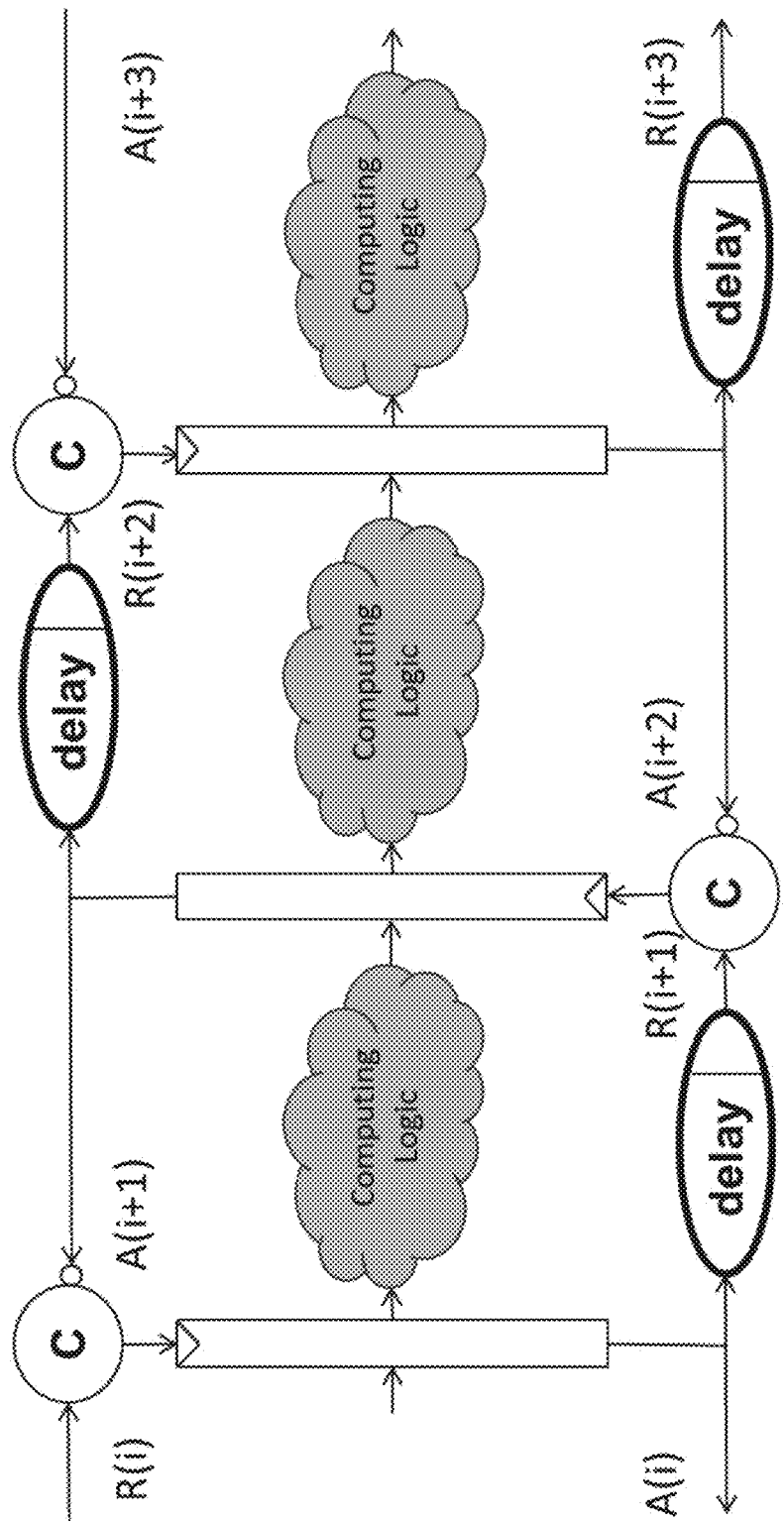
FIG. 1 illustrates a Sutherland asynchronous micropipeline architecture.

FIG. 1 illustrates a Sutherland asynchronous micropipeline architecture. The Sutherland asynchronous micropipeline architecture is one form of asynchronous micropipeline architecture that uses a handshaking protocol to operate the micropipeline building blocks. The Sutherland asynchronous micropipeline architecture includes a plurality of computing logics linked in sequence via flip-flops or latches. The computing logics are arranged in series and separated by the latches between each two adjacent computing logics. The handshaking protocol is realized by Muller-C elements (labeled C) to control the latches and thus determine whether and when to pass information between the computing logics. This allows for an asynchronous or clockless control of the pipeline without the need for timing signal. A Muller-C element has an output coupled to a respective latch and two inputs coupled to two other adjacent Muller-C elements, as shown. Each signal has one of two states (e.g., 1 and 0, or true and false). The input signals to the Muller-C elements are indicated by A(i), A(i+1), A(i+2), A(i+3) for the backward direction and R(i), R(i+1), R(i+2), R(i+3) for the forward direction, where i, i+1, i+2, i+3 indicate the respective stages in the series. The inputs in the forward direction to Muller-C elements are delayed signals, via delay logic stages. The Muller-C element also has a memory that stores the state of its previous output signal to the respective latch. A Muller-C element sends the next output signal according to the input signals and the previous output signal. Specifically, if the two input signals, R and A, to the Muller-C element have different state, then the Muller-C element outputs A to the respective latch. Otherwise, the previous output state is held. The latch passes the signals between the two adjacent computing logics according to the output signal of the respective Muller-C element. The latch has a memory of the last output signal state. If there is state change in the current output signal to the latch, then the latch allows the information (e.g., one or more processed bits) to pass from the preceding computing logic to the next logic. If there is no change in the state, then the latch blocks the information from passing. This Muller-C element is a non-standard chip component that is not typically supported in function libraries provided by manufacturers for supporting various chip components and logics. Therefore, implementing on a chip the function of the architecture above based on the non-standard Muller-C elements is challenging and not desirable.

Figure 2:
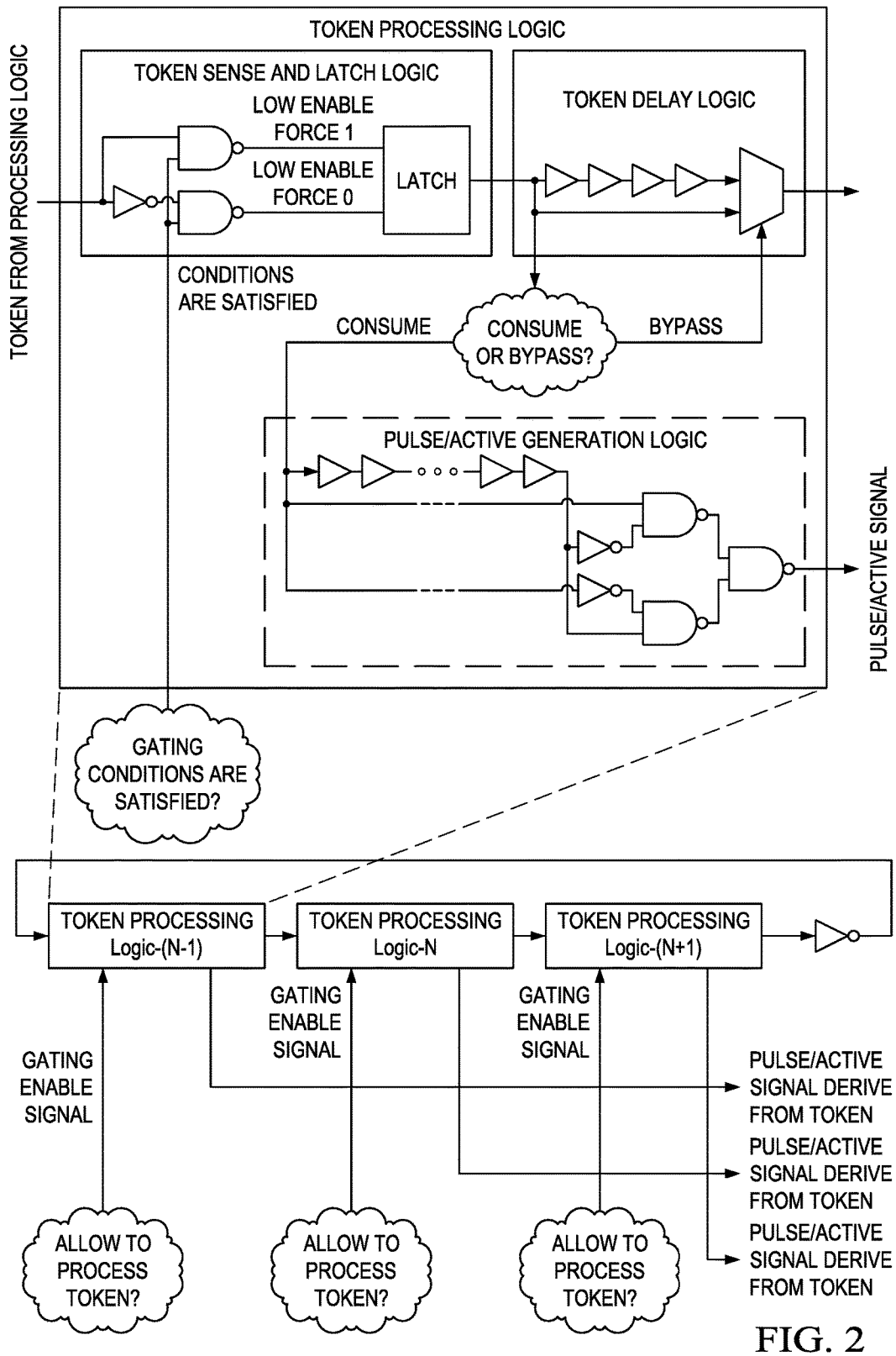
FIG. 2 illustrates a token ring architecture.

FIG. 2 illustrates an example of a token ring architecture which is a suitable alternative to the architecture above in terms of chip implementation. The components of this architecture are supported by standard function libraries for chip implementation. As described above, the Sutherland asynchronous micropipeline architecture requires the handshaking protocol, which is realized by the non-standard Muller-C elements. In order to avoid using Muller-C elements (as in FIG. 1), a series of token processing logics are used to control the processing of different computing logics (not shown), such as processing units on a chip (e.g., ALUs) or other functional calculation units, or the access of the computing logics to system resources, such as registers or memory. To cover the long latency of some computing logics, the token processing logic is replicated to several copies and arranged in a series of token processing logics, as shown. Each token processing logic in the series controls the passing of one or more token signals (associated with one or more resources). A token signal passing through the token processing logics in series forms a token ring. The token ring regulates the access of the computing logics (not shown) to the system resource (e.g., memory, register) associated with that token signal. The token processing logics accept, hold, and pass the token signal between each other in a sequential manner. When a token signal is held by a token processing logic, the computing logic associated with that token processing logic is granted the exclusive access to the resource corresponding to that token signal, until the token signal is passed to a next token processing logic in the ring. Holding and passing the token signal concludes the logic's access or use of the corresponding resource, and is referred to herein as consuming the token. Once the token is consumed, it is released by this logic to a subsequent logic in the ring.

Figure 3:
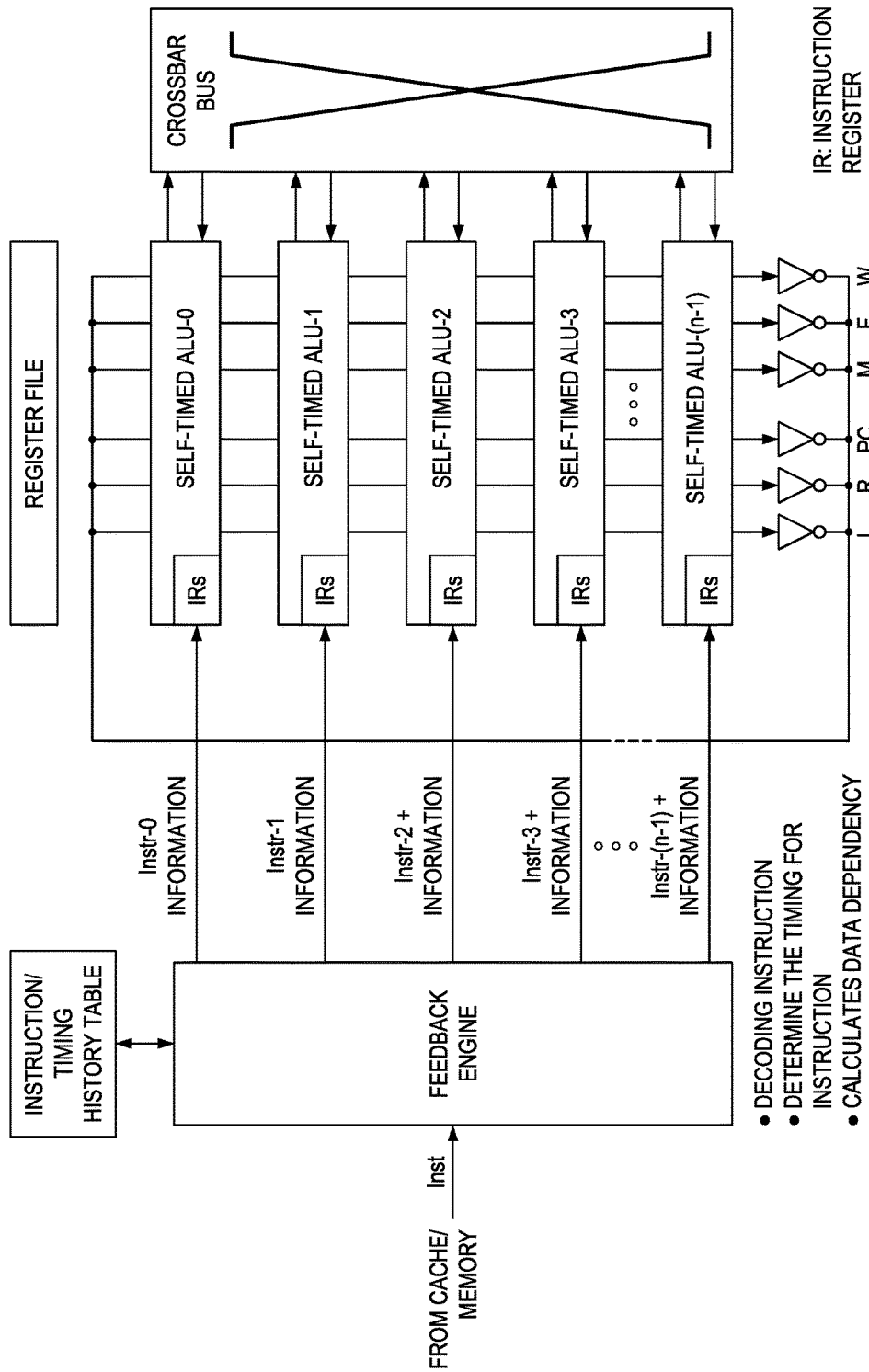
FIG. 3 illustrates an asynchronous processor architecture.

FIG. 3 illustrates an asynchronous processor architecture. The architecture includes a plurality of self-timed (asynchronous) arithmetic and logic units (ALUs) coupled in parallel in a token ring architecture as described above. The ALUs can comprise or correspond to the token processing logics of FIG. 2. The asynchronous processor architecture of FIG. 3 also includes a feedback engine for properly distributing incoming instructions between the ALUs, an instruction/timing history table accessible by the feedback engine for determining the distribution of instructions, a register (memory) accessible by the ALUs, and a crossbar for exchanging needed information between the ALUs. The table is used for indicating timing and dependency information between multiple input instructions to the processor system. The instructions from the instruction cache/memory go through the feedback engine which detects or calculates the data dependencies and determines the timing for instructions using the history table. The feedback engine predecodes each instruction to decide how many input operands this instruction requires. The feedback engine then looks up the history table to find whether this piece of data is on the crossbar or on the register file. If the data is found on the crossbar bus, the feedback engine calculates which ALU produces the data. This information is tagged to the instruction dispatched to the ALUs. The feedback engine also updates accordingly the history table.

Figure 4:
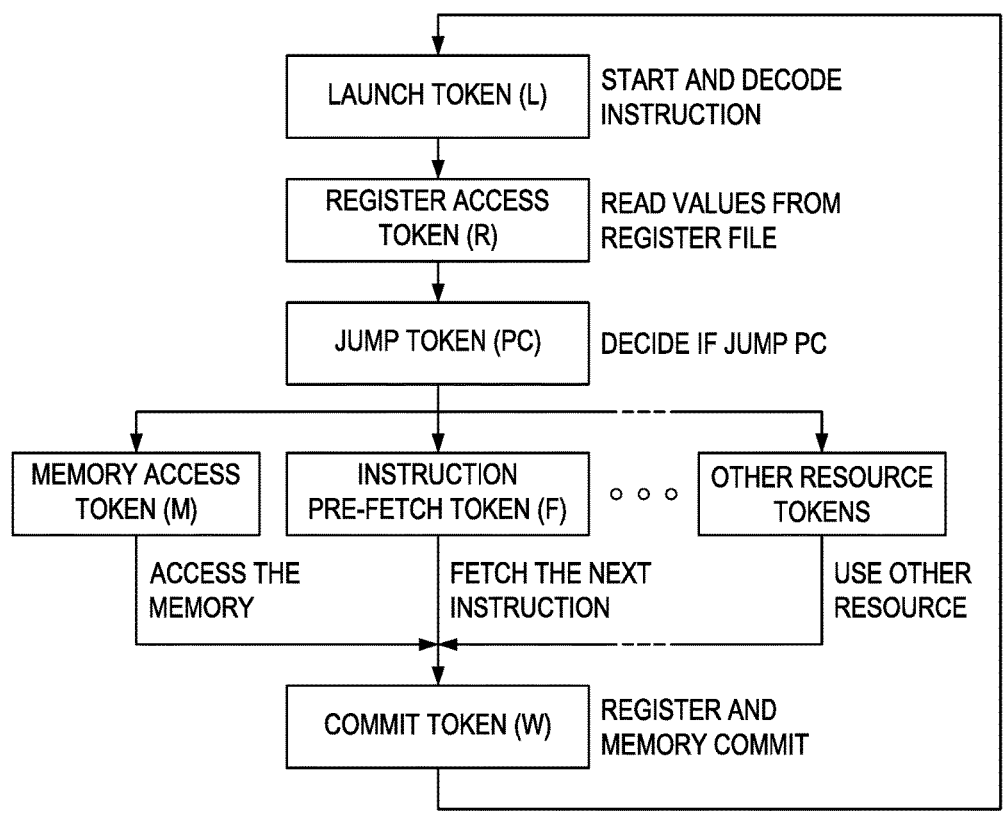
FIG. 4 illustrates token based pipelining with gating within an arithmetic and logic unit (ALU)

FIG. 4 illustrates token based pipelining with gating within an ALU, also referred to herein as token based pipelining for an intra-ALU token gating system. According to this pipelining, designated tokens are used to gate other designated tokens in a given order of the pipeline. This means when a designated token passes through an ALU, a second designated token is then allowed to be processed and passed by the same ALU in the token ring architecture. In other words, releasing one token by the ALU becomes a condition to consume (process) another token in that ALU in that given order. FIG. 4 illustrates one possible example of token-gating relationship. Specifically, in this example, the launch token (L) gates the register access token (R), which in turn gates the jump token (PC token). The jump token gates the memory access token (M), the instruction pre-fetch token (F), and possibly other resource tokens that may be used. This means that tokens M, F, and other resource tokens can only be consumed by the ALU after passing the jump token. These tokens gate the commit token (W) to register or memory. The commit token is also referred to herein as a token for writing the instruction. The commit token in turn gates the launch token. The gating signal from the gating token (a token in the pipeline) is used as input into a consumption condition logic of the gated token (the token in the next order of the pipeline). For example, the launch-token (L) generates an active signal to the register access or read token (R), when L is released to the next ALU. This guarantees that any ALU would not read the register file until an instruction is actually started by the launch-token.

Figure 5:
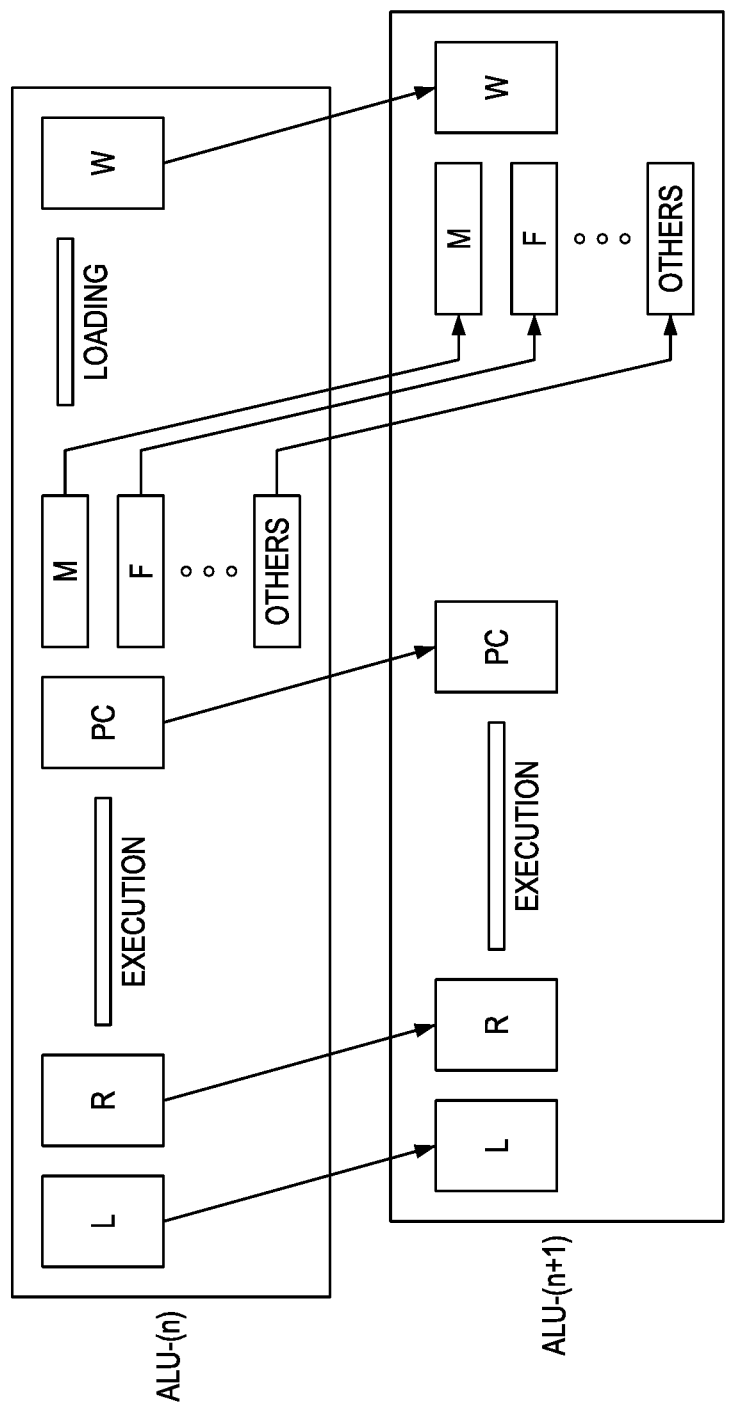
FIG. 5 illustrates token based pipelining with passing between ALUs.

FIG. 5 illustrates token based pipelining with passing between ALUs, also referred to herein as token based pipelining for an inter-ALU token passing system. According to this pipelining, a consumed token signal can trigger a pulse to a common resource. For example, the register-access token (R) triggers a pulse to the register file. The token signal is delayed before it is released to the next ALU for such a period, preventing a structural hazard on this common resource (the register file) between ALU-(n) and ALU-(n+1). The tokens preserve multiple ALUs from launching and committing (or writing) instructions in the program counter order, and also avoid structural hazard among the multiple ALUs.

Figure 6:
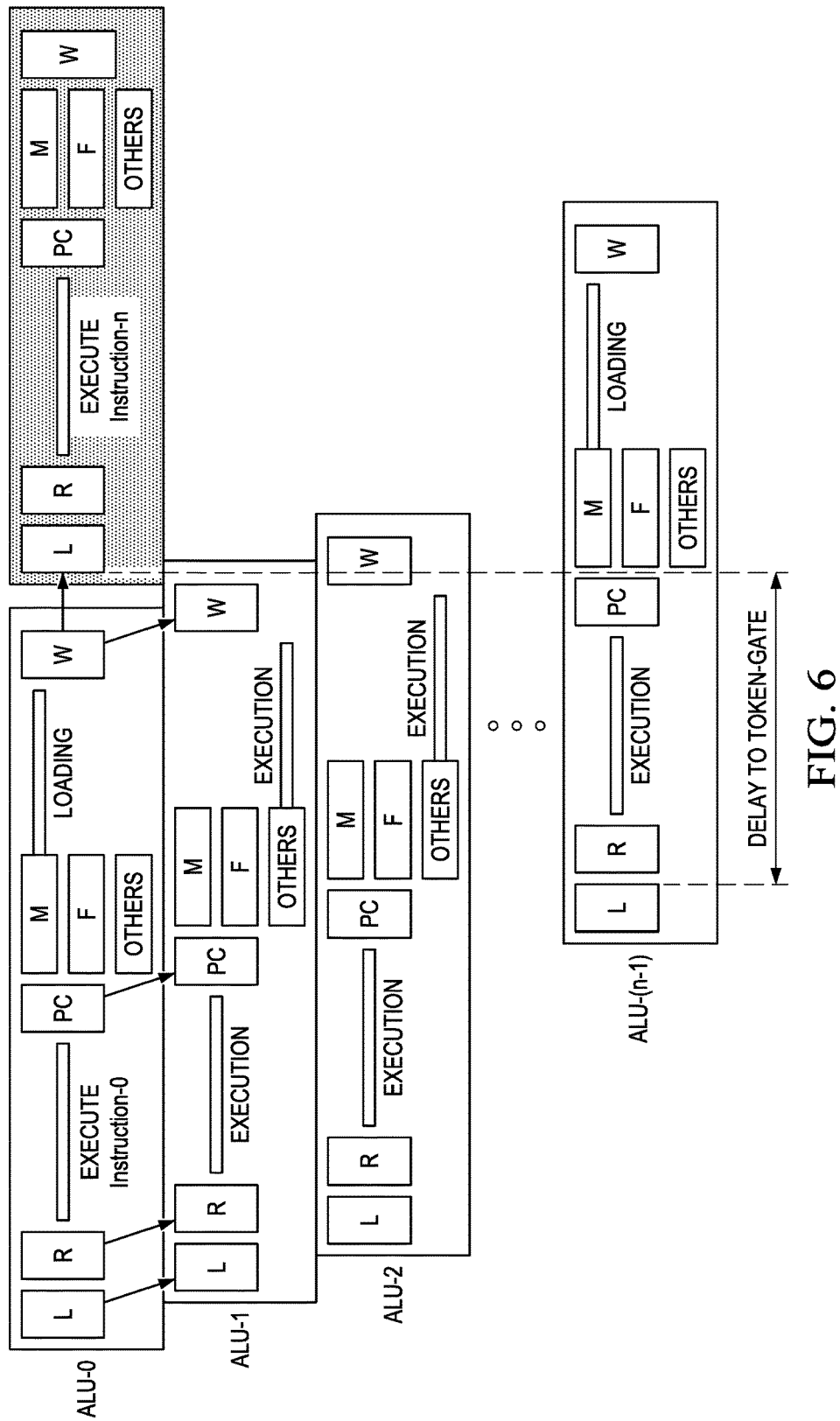
FIG. 6 illustrates a scenario for token delay in a token based processor.

FIG. 6 illustrates a scenario for token delay in a token based processor comprising the self-timed ALU set (described in FIG. 3) in accordance with the token system (described in FIGS. 4 and 5). In this scenario, an ALU (ALU-0) cannot launch a next instruction (instruction-n) until the commit token (W) is released by this ALU, even if the launch token (L) and the register access token (R) were released by other ALUs and available for this ALU (ALU-0). The scenario shows a token delay time from the moment of releasing L by another ALU (ALU-(n−1)) to the moment when the ALU-0 owns L subsequent to releasing W. The delay is caused by the gating condition between the W token and the L token of the token based pipelining described above. Such delay can increase computation latency and reduce overall all processing speed and performance. The system and method embodiments of the disclosure are described in the context of an ALU set in the asynchronous processor. The ALUs serve as instruction processing units that perform calculations and provide results for the corresponding issued instructions. However in other embodiments, the processor may comprise other instruction processing units instead of the ALUs. The instruction units may be referred to sometimes as execution units (XUs) or execution logics, and may have similar, different or additional functions for handling instructions than the ALUs described above. In general, the system and method embodiments described herein can apply to any instruction execution or processing units that operate, in an asynchronous processor architecture, using the token based system described below.

Figure 7:
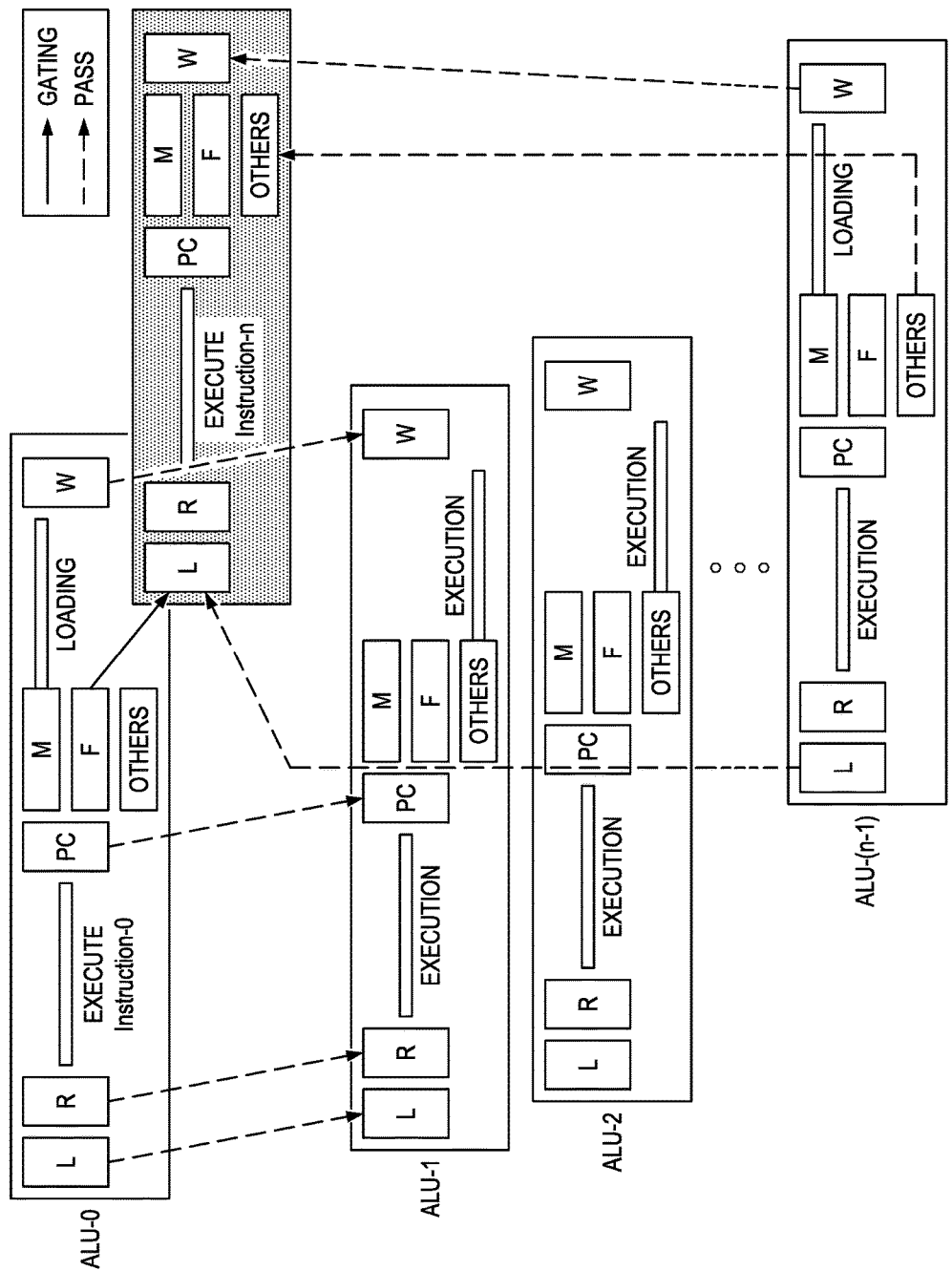
FIG. 7 illustrates an embodiment of a pipelined ALU system.

FIG. 7 illustrates an embodiment of a pipelined ALU system that resolves the token delay issue described above, and hence reduces latency and improves processor performance. The ALUs in this system are configured to execute a two stage pipeline, where token pipelining by the ALU can partially overlap for two consecutive instructions. Specifically, a next instruction that succeeds a current executed instruction in an ALU is launched by the ALU even before releasing the W token for the current instruction if two conditions are satisfied: if this ALU owns the launch token (L) for the next instruction and if the next instruction has been fetched by the ALU. This means that the ALU does not need to wait until the commit token (W) for the first instruction is released by the ALU to begin launching and executing the next instruction, which removes the token delay problem described above. In another embodiment, the system may comprise execution units other than the ALUs.

Figure 8:
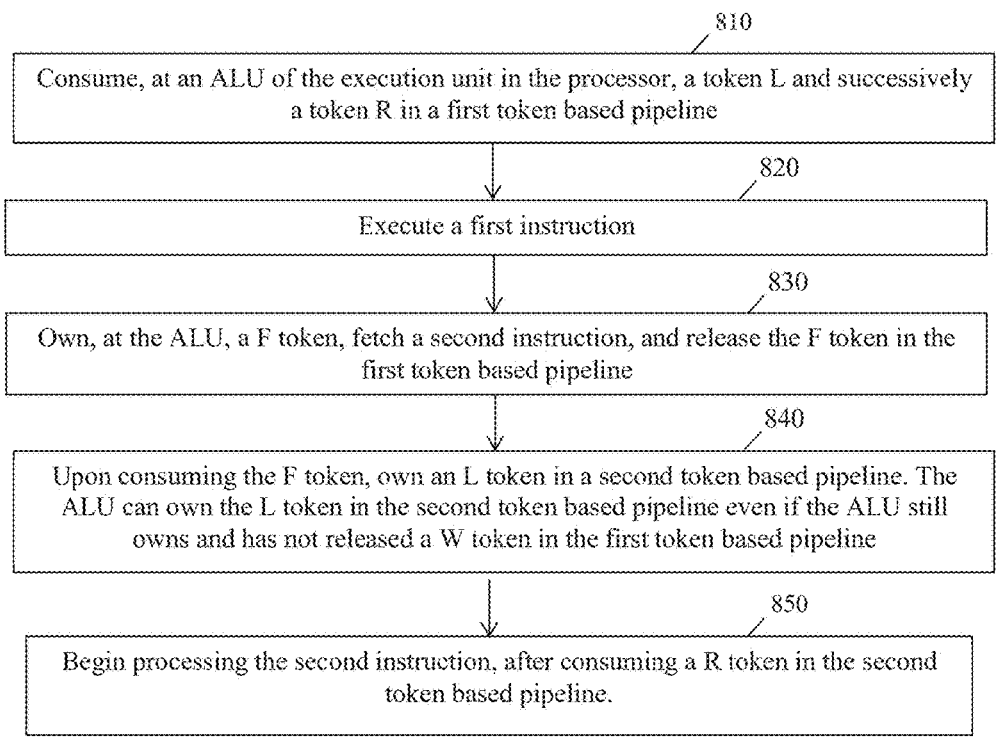
FIG. 8 illustrates an embodiment of a method applying a pipelined ALU for an asynchronous processor.

FIG. 8 illustrates an embodiment of a method applying a pipelined ALU (or instruction execution unit) for an asynchronous processor, in accordance with the pipeline ALU system above. At step 810, an ALU of the execution unit in the processor consumes (owns and releases) a token L and successively a token R in a token based pipeline. At step 820, the ALU executes (e.g., processes and performs necessary calculations for) a first instruction. At step 830, the ALU owns a F token, fetches a second instruction, and releases the F token in the token based pipeline. At step 840, upon consuming the F token, the ALU owns an L token in the token based pipeline. Specifically, the ALU can own the L token in the token based pipeline even if the ALU still owns and has not released a W token in the token based pipeline. Subsequently, at step 850, the ALU begins processing the second instruction (after consuming a R token in the token based pipeline). The tokens in the token based pipeline can be gated similar to the token based pipelining of FIG. 4. The second instruction is launched by the LAU if the ALU owns the L token in the second pipeline and if the ALU fetches the second instruction (when the ALU consumes the F token in the first pipeline).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by an asynchronous processor, the method comprising:
fetching, at an instruction execution unit (XU) of the asynchronous processor, a first instruction;
executing the first instruction in the XU, wherein the first instruction is written to a memory by the XU following execution of the first instruction in the XU;
upon holding, at the XU, a token for pre-fetching a next instruction, fetching a second instruction before the first instruction has been written to the memory following execution of the first instruction, the token for pre-fetching the next instruction and a token for writing the first instruction permitting the XU to fetch the second instruction before the first instruction having been written to memory, wherein the second instruction is executed regardless whether the XU holds the token for writing the first instruction, wherein the second instruction is a next instruction for execution immediately following the first instruction, and wherein the token for writing the first instruction gates writing the second instruction; and
upon holding, at the XU, a token for launching the next instruction, executing the second instruction, the token for pre-fetching the next instruction gating the token for launching the next instruction.

2. The method of claim 1 further comprising holding, at the XU, the token for writing the first instruction while executing the second instruction.

3. The method of claim 2 further comprising:
completing executing of the first instruction in the XU; and
writing the first instruction to the memory before finishing or during executing the second instruction in the XU.

4. The method of claim 1, wherein the token for launching the next instruction is fetched at the XU after the token for launching the next instruction is released by a second XU of the asynchronous processor.

5. The method of claim 1, wherein the token for fetching the next instruction and the token for launching the next instruction are passed between a plurality of XUs of the asynchronous processor according to a token pipelining logic where releasing the token for fetching the next instruction is a condition to process the token for launching the next instruction.

6. The method of claim 1, wherein the token for fetching the next instruction and the token for launching the next instruction are passed between a plurality of XUs of the asynchronous processor according to a token pipelining logic where releasing the token for fetching the next instruction is a condition to process the token for writing the first instruction.

7. The method of claim 1, wherein releasing, at the XU, the token for launching the next instruction is a condition to process a token for accessing a register, wherein releasing the token for accessing the register is a condition to process a program counter (PC) token, wherein releasing the PC token is a condition to process one of a token for accessing memory, the token for fetching the next instruction, and optionally other resource tokens, and wherein releasing the token for accessing memory, the token for fetching the next instruction, or the other resource tokens is a condition to process the token for writing the first instruction.

8. A method performed by an arithmetic and logic unit (ALU) of an asynchronous processor, the method comprising:
fetching, by the ALU, a first instruction;
executing, at the ALU, the first instruction, and writing the first instruction to a memory;
upon holding, at the ALU, a token for pre-fetching a next instruction, fetching, by the ALU, a second instruction before the first instruction is written to the memory by the ALU following execution of the first instruction, the token for pre-fetching the next instruction and a token for writing the first instruction to the memory permitting the ALU to fetch the second instruction before the first instruction having been written to memory, wherein the second instruction is executed regardless whether the ALU holds the token for writing the first instruction, wherein the second instruction is a next instruction for execution immediately following the first instruction, and wherein the token for writing the first instruction gates writing the second instruction; and
upon holding, at the ALU, a token for launching the next instruction, initiating, at the ALU, execution of the second instruction before writing the first instruction to the memory, the token for pre-fetching the next instruction gating the token for launching the next instruction.

9. The method of claim 8, wherein the first instruction is written to the memory by the ALU before completing the execution of the second instruction.

10. The method of claim 8, further comprising receiving the token for writing the first instruction to a memory after receiving the token for launching the next instruction.

11. An asynchronous processor comprising:
a non-transitory memory;
a plurality of instruction execution units (XUs) arranged in a ring architecture for passing tokens, wherein a first XU in the plurality of XUs comprises a logic circuit configured to:
fetch a first instruction from the non-transitory memory;
execute the first instruction, wherein the first instruction is written to a memory by the first XU following execution of the first instruction in the first XU;
upon holding, at the first XU, a token for pre-fetching a next instruction, fetch a second instruction from the non-transitory memory before the first instruction has been written to the memory following execution of the first instruction, the token for pre-fetching the next instruction and a token for writing the first instruction to the memory permitting the first XU to fetch the second instruction before the first instruction having been written to memory, wherein the second instruction is executed regardless whether the first XU holds the token for writing the first instruction, wherein the second instruction is a next instruction for execution immediately following the first instruction, and wherein the token for writing the first instruction gates writing the second instruction; and
execute the second instruction regardless of whether the first XU holds the token for writing the first instruction to the memory, the token for pre-fetching the next instruction gating the token for launching the next instruction.

12. The processor of claim 11, wherein the logic circuit is further configured to hold a token for launching a next instruction before executing the second instruction.

13. The processor of claim 12, wherein the logic circuit is further configured to hold a token for fetching a next instruction before fetching the second instruction.

14. The processor of claim 13, wherein the logic circuit is further configured to release the token for fetching the next instruction before processing the token for launching the next instruction.

15. The processor of claim 11, wherein the logic circuit is further configured to write the first instruction to the memory after fetching the second instruction.

16. The processor of claim 11, wherein the logic circuit is further configured to write the first instruction to the memory after starting executing the second instruction.

17. The processor of claim 11, wherein the logic circuit is further configured to hold the token for writing the first instruction to the memory before writing the first instruction to the memory.

18. The processor of claim 11, wherein the plurality of XUs are arithmetic and logic units (ALUs).

* * * * *